(12) United States Patent
Christman et al.

(10) Patent No.: US 7,114,609 B2
(45) Date of Patent: Oct. 3, 2006

(54) PRODUCT DIVERTER AND METHOD

(75) Inventors: Brian Christman, Denmark, WI (US); Larry Wierschke, Green Bay, WI (US)

(73) Assignee: Paper Converting Machine Company, Green Bay, WI (US)

( * ) Notice: Subject to any disclaimer, the term of this patent is extended or adjusted under 35 U.S.C. 154(b) by 0 days.

(21) Appl. No.: 11/053,282

(22) Filed: Feb. 8, 2005

(65) Prior Publication Data

US 2006/0175179 A1 Aug. 10, 2006

(51) Int. Cl.
*B65G 47/26* (2006.01)
(52) U.S. Cl. .................. 198/442; 198/419.2
(58) Field of Classification Search ........... 198/436, 198/442, 452, 461.2, 419.2, 429; 53/448
See application file for complete search history.

(56) References Cited

U.S. PATENT DOCUMENTS

| | | | | |
|---|---|---|---|---|
| 2,451,104 A | * | 10/1948 | Lowe | 198/442 |
| 3,402,803 A | * | 9/1968 | Griner | 198/419.2 |
| 4,159,760 A | | 7/1979 | Kovacs et al. | 198/419 |
| 4,430,844 A | | 2/1984 | James | 53/450 |
| 5,174,430 A | * | 12/1992 | Ebira | 198/418.5 |
| 5,522,292 A | | 6/1996 | Biagiotti | 83/38 |
| 5,944,165 A | * | 8/1999 | Mannlein et al. | 198/442 |
| 6,131,372 A | * | 10/2000 | Pruett | 53/448 |

FOREIGN PATENT DOCUMENTS

JP 6-227641 * 8/1994 ........... 198/442

* cited by examiner

*Primary Examiner*—James R. Bidwell
(74) *Attorney, Agent, or Firm*—Greer, Burns & Crain, Ltd.

(57) ABSTRACT

A wrapping machine for wrapping products is provided with a product diverter for producing package formats which are greater in width than the number of lanes which deliver product to the wrapper machine. A plurality of metering belts advance product from an infeed conveyor along a plurality of infeed lanes. The metering belts are independently driven so that product can be advanced in each lane independently of the product in the other lanes. The metering belts deliver product to accelerator belts which speed up the product to create a gap between successive products in a lane. A first flighted conveyor advances product from the accelerator belts to a plurality of pivotally mounted diverting gates, corresponding in number to the number of infeed lanes. Each of the diverting gates direct the product to one of a plurality of output lanes. The number of output lanes is equal to, less than, or greater than the number of infeed lanes. The diverting gates are independently controlled so that each diverting gate can be pivoted independently of the other gates. A second flighted conveyor advances product from the discharge end of the diverter gates along the output lanes.

20 Claims, 18 Drawing Sheets

PRODUCT DIVERTER AND METHOD

BACKGROUND

This invention relates to an apparatus and method to handle objects, such as rolled tissue product, within a wrapping machine that is capable of receiving at its input a substantially continuous flow of randomly spaced articles that are separated into a discrete number of lanes and discharging at its output side a continuous flow of articles separated into a discrete number of lanes which is equal to, less than, or greater than, the number of lanes at the infeed. A second objective of this apparatus is that the objects are discharged in an organized and timed relationship to further processing in the wrapping machine.

SUMMARY OF PRIOR ART

In all present art, in the production of products comprising tissue paper, a tissue web is wound into rolls of substantial width, commonly called "logs", that are of appropriate diameter for consumer use. The full width "logs" are discharged from the rewinder, typically accumulated in a bucket type conveyor, and eventually transported to a cutting station. The cutting station, commonly called the "log saw", typically uses an orbiting blade and a cyclical conveying motion to cut the full width rolls into a series of short rolls that are of acceptable width for consumer use. In a typical application, four logs are cut simultaneously, in discrete lanes, with each rotation of the orbit head. The cut rolls are then discharged from the saw in their respective lanes, corresponding to the number of logs being cut in one cutting cycle.

Once discharged from the log saw, the cut rolls are typically conveyed and accumulated in a random fashion, on a belted or plastic chain conveyor, called the infeed conveyor. The infeed conveyor uses product guides to maintain the discrete spacing between lanes and conveys the cut rolls to a station for packaging the product, called a "wrapper". The product enters the wrapper through a set of metering belts, which are used to coordinate and time the placement of the product for subsequent wrapping operations.

According to this known technology, the metering belts have the ability to deliver one, two, three, or all four lanes of product into the wrapper, depending on the width of the desired package format being produced. Another known function of the metering belts is to feed one or more products in each lane per cycle, to alter the desired length of the package format being produced.

MORE DETAILED DESCRIPTION OF PRIOR ART

As mentioned above, in the production of tissue and toweling, a tissue web is converted into rolls of substantial width at a rewinding station, to obtain rolls of proper diameter, followed by a cutting station, to obtain rolls of acceptable length. The cutting station, commonly called the "log saw", typically uses an orbiting blade and a cyclical conveying motion to cut the full width rolls into a series of short rolls that are of acceptable length for consumer use. An example of a cutting station of this type is described in U.S. Pat. No. 5,522,292.

In a typical log saw application, four logs are cut simultaneously, in discrete lanes, with each rotation of the orbit head. The cut rolls are then discharged from the saw in their respective lanes, corresponding in number to the number of logs being cut in each cutting cycle.

Once discharged from the log saw, the cut rolls are randomly conveyed and accumulated in their corresponding lanes using a belted or plastic chain conveyor, typically called the "infeed conveyor". The infeed conveyor transports the cut rolls in a random fashion, to a station for packaging the rolls, typically called the "wrapper". An example of a wrapping station of this type is described in U.S. Pat. No. 4,430,844.

At the entrance of the wrapper, a set of upper and lower metering belts coordinates and times the placement the product for subsequent wrapping operations. An example of a metering belt station of this type is described in U.S. Pat. No. 4,159,760. The metering belts have the ability to deliver one, two, three, or all four lanes of product into the wrapper, depending on the width of the desired package format being produced. A second purpose of the metering belts is to feed the proper number of rolls within each lane into the wrapper for further processing.

The problem with the present art is that package formats cannot be produced that require more products in width than the number of lanes of product delivered at the infeed of the wrapper. In a typical application where the saw delivers four lanes of product to the wrapper infeed, the wrapper is limited to producing package formats that are four products wide or less. If the user desires producing a five wide package format, ancillary equipment must be installed upstream of the wrapper to divert product into the proper number of infeed lanes. This equipment can be costly to install and maintain and requires a significant amount of additional floor space. This equipment is typically unreliable and reduces the overall operational efficiency of converting line due to frequent jamming of the product.

To solve this problem, a reliable method is needed to divert product into a greater number of lanes after entering the wrapper than is delivered at the wrapper infeed. The system must also retain the ability of processing products into package formats with a lesser number of lanes than are delivered at the infeed of the wrapper.

SUMMARY OF THE INVENTION

The instant invention uses a set of pivoting gates, a pair of individually driven upper and lower flighted conveyors, and a series of product guides that work in concert with the metering belts to divert product into the proper number of lanes for further processing in the wrapper. These devices are controlled by appropriate means, such as servo motors and a programmable controller, to properly time the actuation of said devices and deliver the product at the appropriate time in the diverting/converging cycle.

An object of the present invention is to include a station for diverting product within the wrapper in order to produce package formats that are greater in width than the number of lanes of product being delivered at the wrapper infeed to solve the above-mentioned problems.

A second object of the present invention is to offer an alternative method that maintains the ability to produce package formats that are lesser in width than the number of lanes of product being delivered at the wrapper infeed.

These objectives are obtained by a station at the wrapper infeed, said station comprising:
  a horizontal supporting surface;
  a conventional set of metering belts for feeding items, or groups of items, one after another to a diverting station, said metering belts being independently driven and capable of cycling continuously or intermittently with one or more items being fed to the diverting station during a portion of the cycle and with the items being randomly delivered at the infeed end at some average rate;

a pair of opposing, upper and lower, driven accelerator belts running at a surface speed that is slightly faster than the surface speed of the metering belts, creating a gap between successive products. The upper accelerator belt is mounted on a pair of linear guides with a screw adjustment means to allow for product size variations. A series of parallel product guide rails are mounted between and extend through the upper and lower opposing belts. The guide rails are adjustable in width for variable product sizes, to guide the product and maintain the positional relationship between adjacent lanes;

a series of diverting gates, pivotally mounted to the ends of said parallel guides, corresponding in number to the number of lanes of product delivered at the wrapper infeed. The angular position of said pivoting gates is controlled independently using a series of servo motors that are mechanically linked to the gates through a turnbuckle and crank arm arrangement. The pivot ends of said gates receive articles in discrete lanes corresponding in number and spacing to the spacing between said metering belts, and the gates deliver at their discharge end a different lane-to-lane spacing. The gates are width adjustable for different product sizes and are linked to the width adjustment of the parallel product guide rails;

a lower driven flighted conveyor that receives product at the discharge end of the accelerator belts, carries the product through the diverting gates, and delivers the product for further processing. The flighted conveyor, working in a timed relationship with the metering belts and accelerator belts, cycles continuously to insert bars between successive products and place them in timed relationship for further processing. The lower driven flighted conveyor, working in concert with the diverting gates, has the capability of varying its forward velocity to allow the gates to fully cycle between adjacent lanes before delivering product into the adjacent section;

an upper, driven flighted conveyor that receives product from said lower, driven flighted conveyor at the exit of the diverting gates, to accumulate the product in the proper number of lanes for further processing. The upper driven flighted conveyor is mounted above a dead plate or stationary plate for accumulating product while working in concert with the lower flighted conveyor to cycle bars between successive products. A series of product guide rails extend through the upper flighted conveyor, and are adjustable in width for variable product sizes to merge product on the machine centerline while maintaining the positional relationship for further processing.

DESCRIPTION OF SPECIFIC EMBODIMENTS

Figure 1:
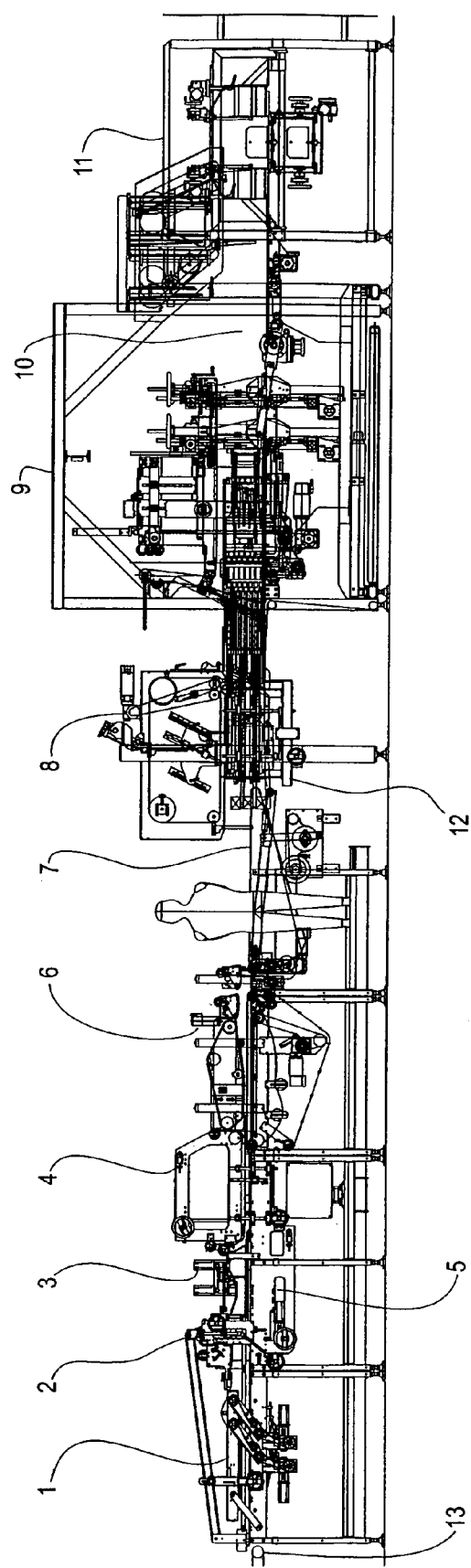
FIG. 1 is a schematic side view of a typical wrapper, showing the proposed stations for diverting product within the wrapper.
Figure 2:
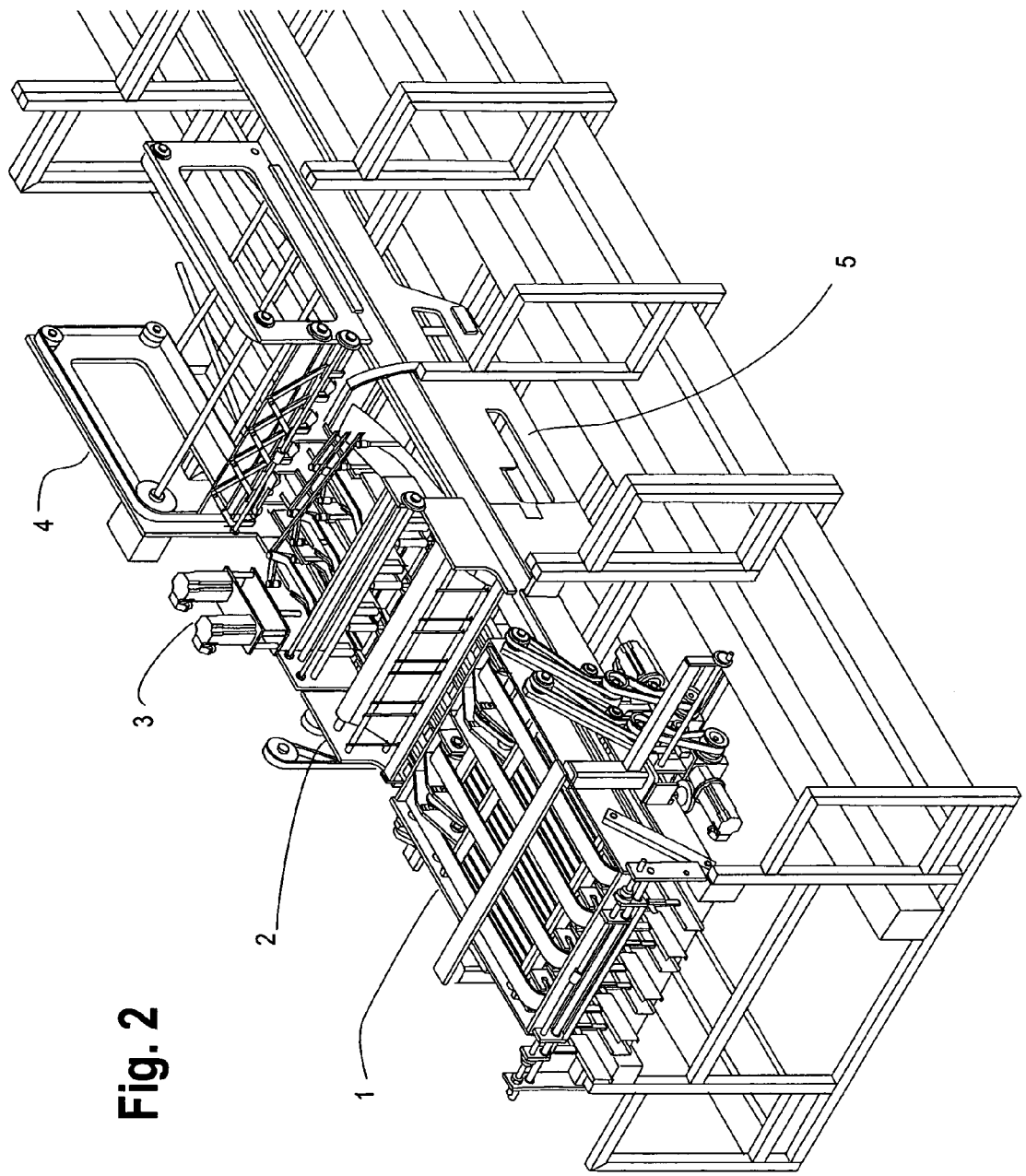
FIG. 2 is a fragmentary perspective view of a diverting station which is formed in accordance with the invention.
Figure 3:
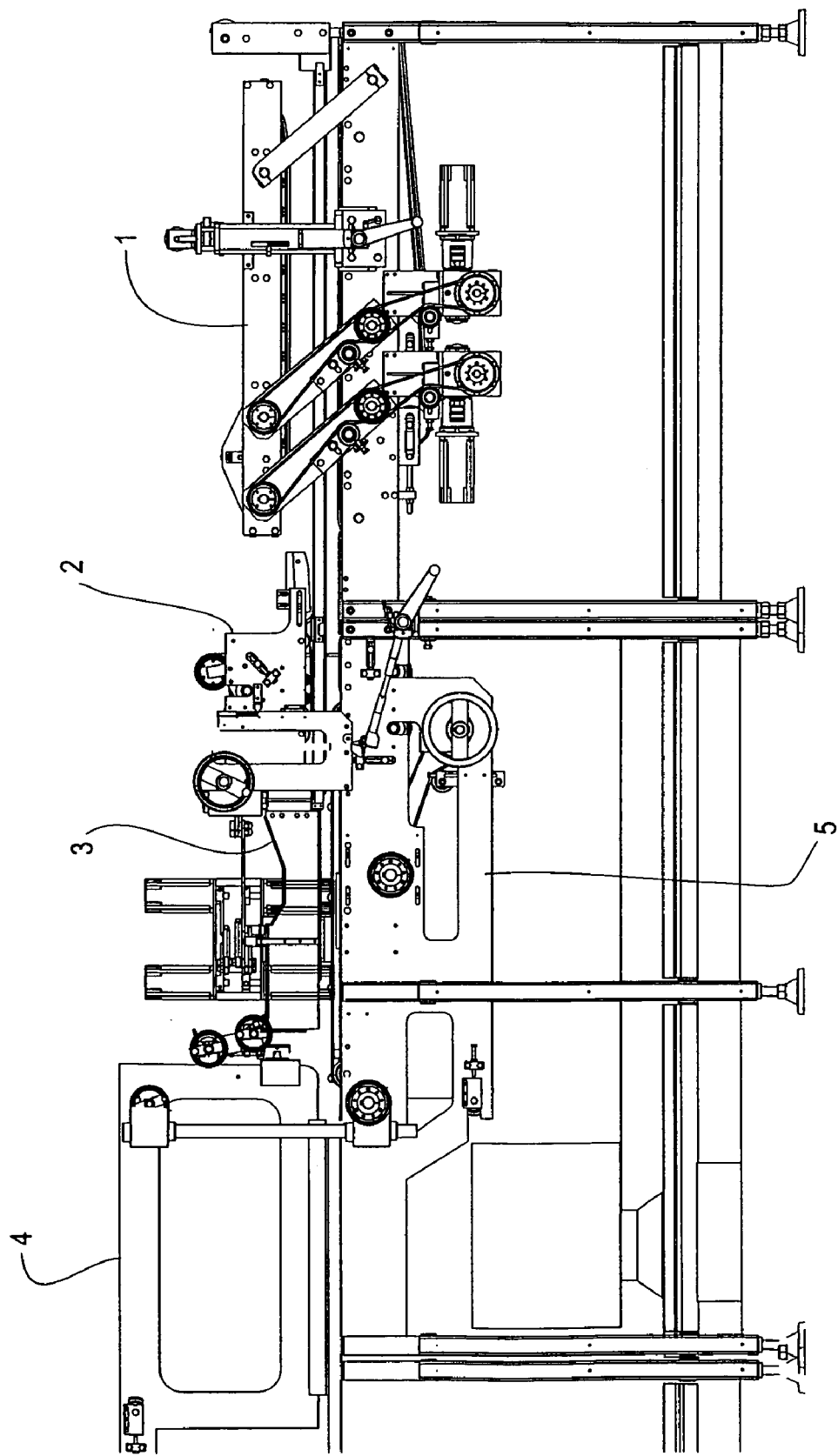
FIG. 3 is a fragmentary side view of the diverting station of FIG. 2.

FIGS. 1–3 illustrate an inventive diverting station integrated in a conventional flow type wrapper, commonly known in the industry and described in U.S. Pat. No. 4,430,844. Product, such as rolled tissue or toweling, is randomly delivered to the wrapper in parallel lanes and presented to the wrapper in a side-by-side relationship by the infeed conveyor 13 at some average rate, where it enters a set of metering belts 1.

The metering belts are used for feeding items, or groups of items, one after the other to the accelerator belts 2. The metering belts are independently driven and capable of cycling continuously or intermittently to feed one or more items to the accelerator belts. The accelerator belts typically run at a surface speed that is slightly faster than the surface speed of metering belts, providing a gap between successive products to allow a lower, driven flighted conveyor 5 to actuate between successive products, to transport the product through diverting gates 3 while placing them in timed relationship into an upper, driven flighted conveyor 4.

The purpose of the diverting gates is to accept product at the infeed end with a side-by-side product spacing that corresponds to the spacing between the metering belts, and deposit them at the discharge end with a different spacing and with the capability of creating at least one additional lane of product for further processing. The upper, driven flighted conveyor provides a location for product to be deposited at the proper lane spacing by the lower, driven flighted conveyor before conveying them in a timed relationship for further processing.

In a typical application, the subsequent machine section would include a product re-orienter 6 (FIG. 1). The purpose of the product re-orienter 6 is to alter the orientation of the product from a horizontal (cores-down) to a vertical (cores-up) position, i.e. stand it on end. This process, commonly known as "upending", is recognized in the industry and disclosed in U.S. Pat. No. 5,301,793.

Following the product re-orienter, a typical stacking station 7 is shown, providing a location for product to be grouped into the proper length for packaging, with the additional capability of superimposing two or more layers of product onto one another. A pivoting device is shown and is well recognized in the industry for efficiently stacking rolled product, such as tissue and toweling.

Once the proper number of products is accumulated onto the stacker dead-plate, a third flighted conveyor works in concert with the stacker positioning device to deposit each layer of product onto a set of shelves 12. Once the proper number of layers is deposited onto the shelves, the product is transferred into the wrapping station 9 by actuating an overhead flighted conveyor 8, commonly referred to as a product loader, where it is enveloped into a tube of polyethylene film. Once the product enters the film tube, the packages are separated from one another at the separator station 10 and eventually discharged into a sealing station 11, where the loose film on the ends of the packages are welded together. The completed packages are finally discharged from the sealing belts and transferred onto a take away device, such as a belted conveyor.

Figure 4:
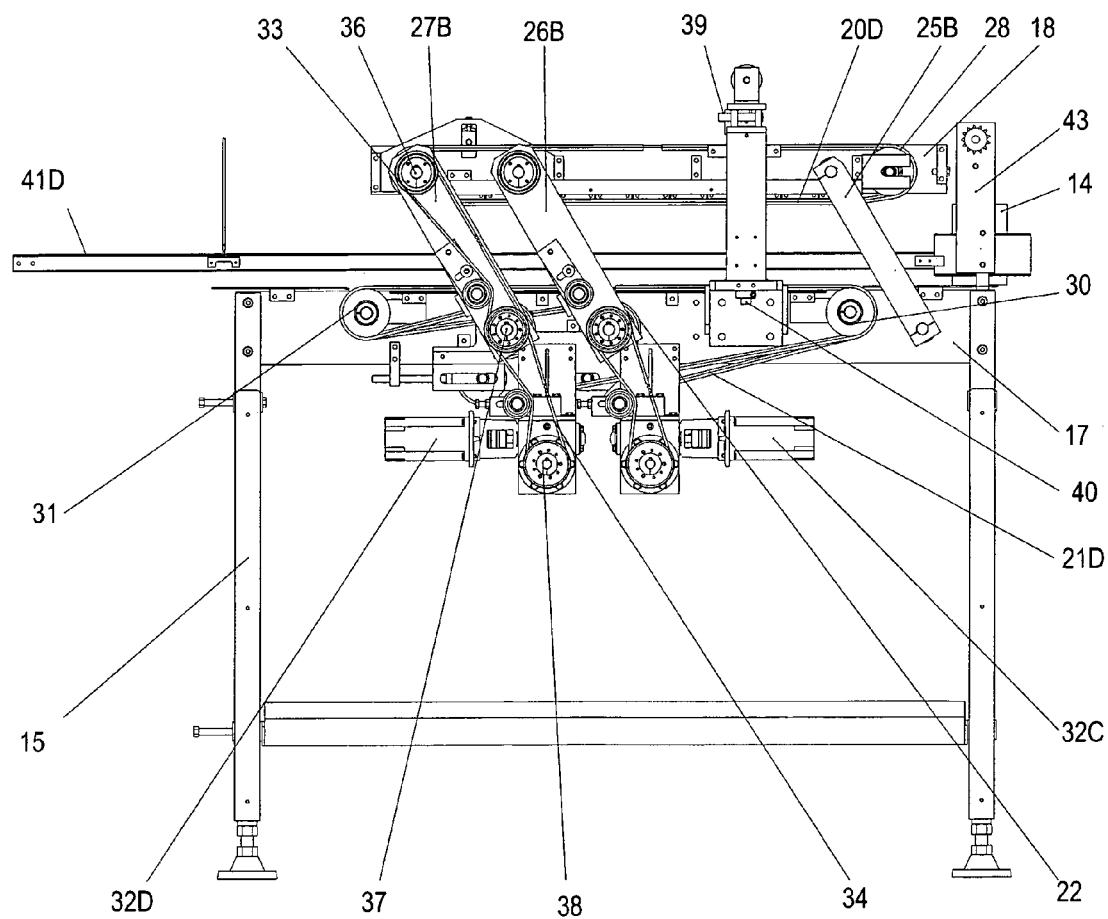
FIG. 4 is a side view of a conventional metering belt station.
Figure 5:
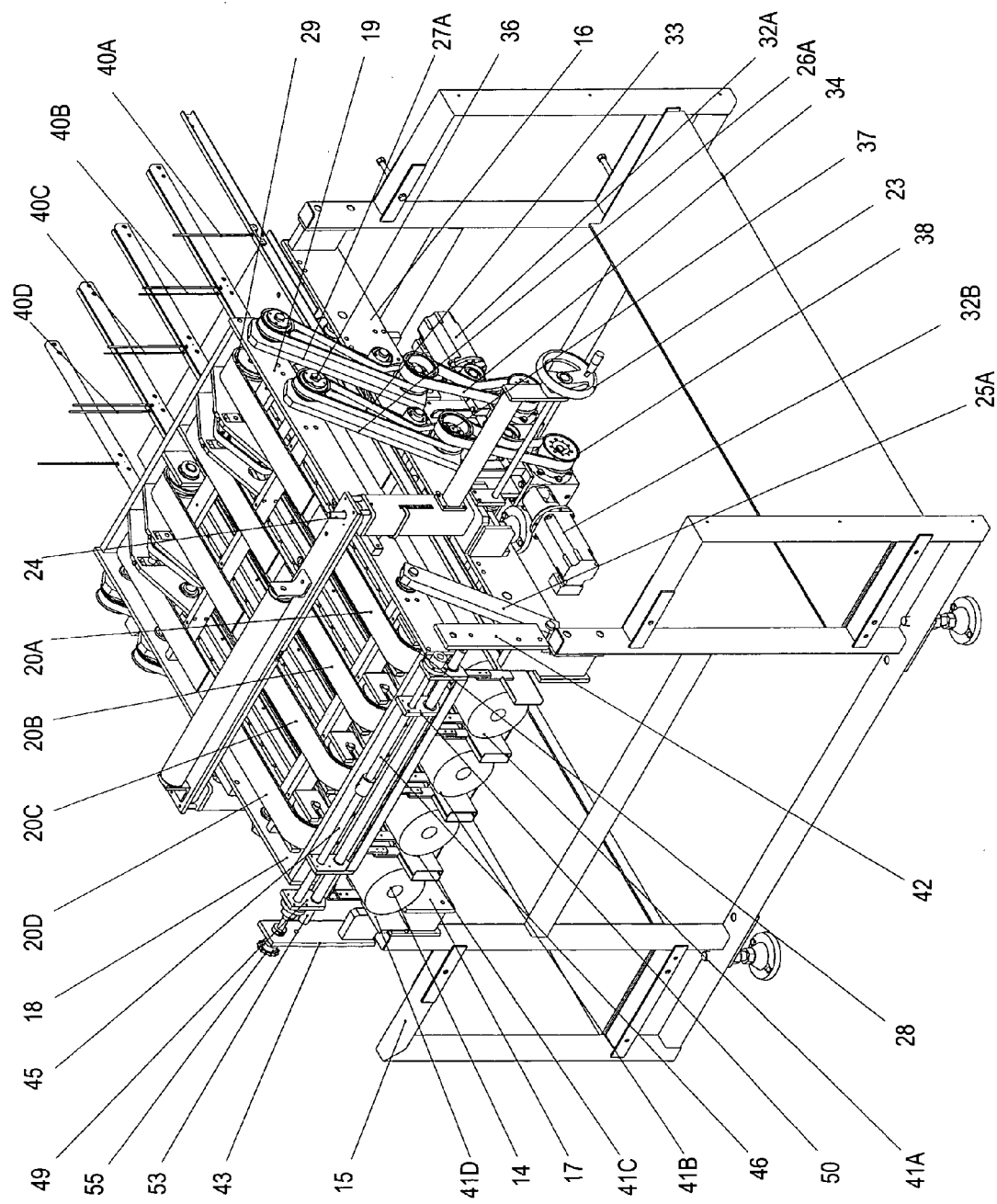
FIG. 5 is a perspective view of the metering belt station.

FIGS. 4 and 5 illustrate a typical metering belt station 1 which receives randomly spaced articles, such as rolled bathroom tissue or household toweling product 14, presented in end-to-end abutment relation from a supply means, typically an infeed conveyor 13, and feeds or releases the product into the wrapper, individually or in groups, in a timed relationship for further processing. The metering belt station consists of sets of upper and lower opposed belts, four sets shown, the quantity of which corresponds to the number of product lanes delivered by the infeed conveyor.

The metering belt module is supported in a set of main frames 15, with the lower belts mounted between a pair of fixed side frames 16, 17 and the upper belts mounted between a pair of moveable side frames 18, 19 that are vertically adjustable for product size changes. The upper belts 20A, 20B, 20C, 20D and lower belts 21A (not shown), 21B (not shown), 21C (not shown), 21D consist of endless conveyor belts mounted in a parallel relationship to one another, with a lateral spacing slightly wider than the width of the product. The upper and lower opposed belts are spaced vertically from one another a distance slightly less than the thickness (i.e. height) of the product so as to positively grip the items.

The vertical spacing between the belts can be altered for product size changes by rotating a manual hand-wheel 23, which in turn rotates a pair of threaded shafts 24, 40 (not shown) that are driven at one end through a pair of sprockets and mechanically linked through a common chain 39, in turn driving a pair of mating threaded blocks (not shown), thereby moving the upper frames. A manual means is shown for altering the vertical spacing. However, a motorized means could be provided to automate this adjustment. Link arms 25A, 25B, 26A, 26B, 27A, 27B are pivotally mounted to the moveable upper side frames on one end and the fixed lower side frames on the opposite end, to maintain a parallel relationship between opposing belts while allowing the vertical spacing to be altered.

Each of the upper belts passes over an idler pulley 28 at one end and a driven pulley 29 at the opposite end. The driven pulley may have improved surface properties to enhance friction between the belt and pulley, such as knurling or rubber covering. Similarly, each of the lower belts passes over a pair of idler pulleys 30, 31 at each end and a driven pulley 22. Each pair of upper and lower belts is independently driven by a rotary actuator 32A, 32B, 32C, 32D, such as a servo motor and gearbox, to control the surface speed of the belts. Each pair of opposed belts is synchronously driven by the motor through a pair of timing belts 33, 34, driving a series of pulleys that are keyed to shafts 36, 37, 38.

Figure 6:
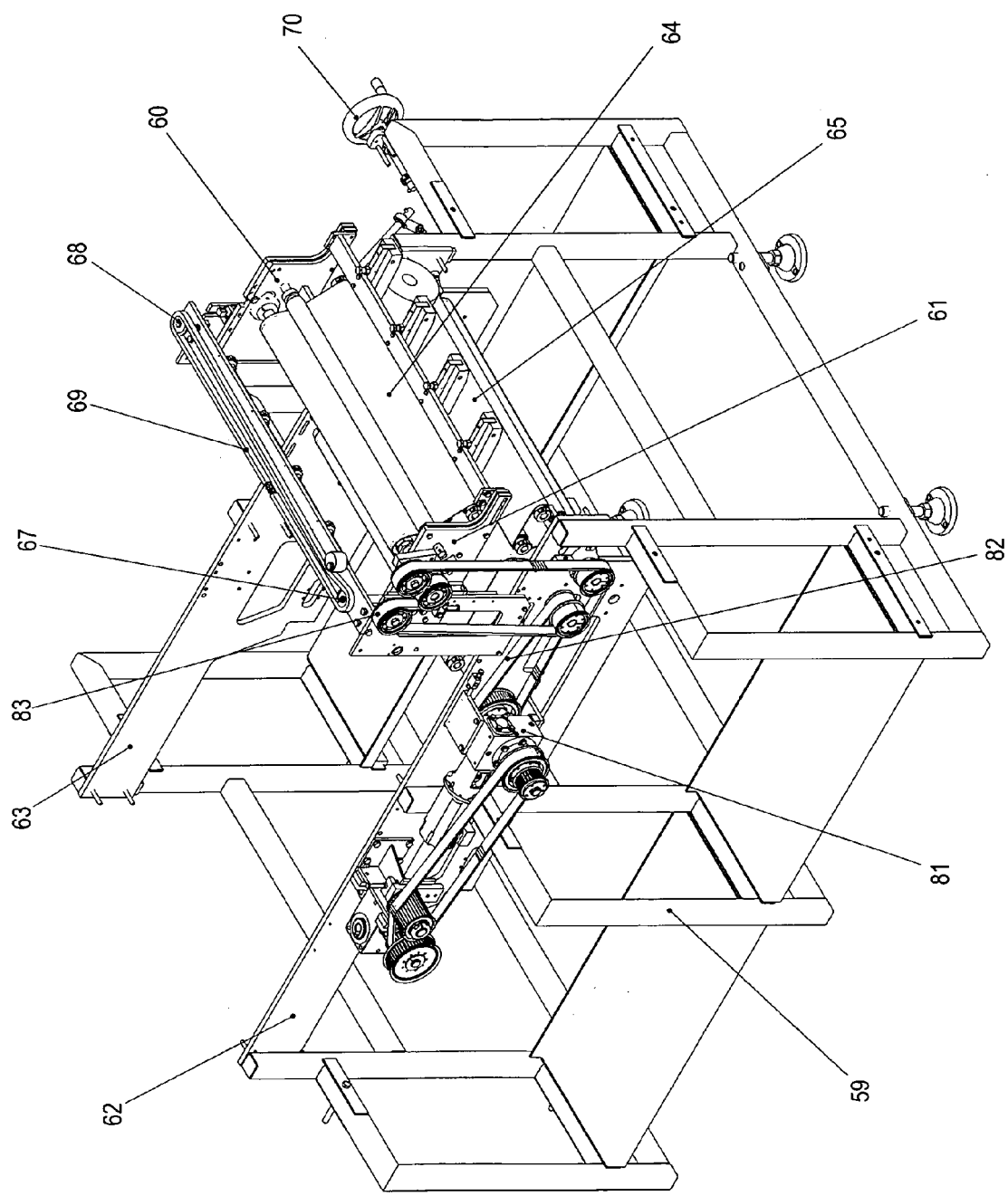
FIG. 6 is a perspective view of an accelerator belt station formed in accordance with the invention.
Figure 7:
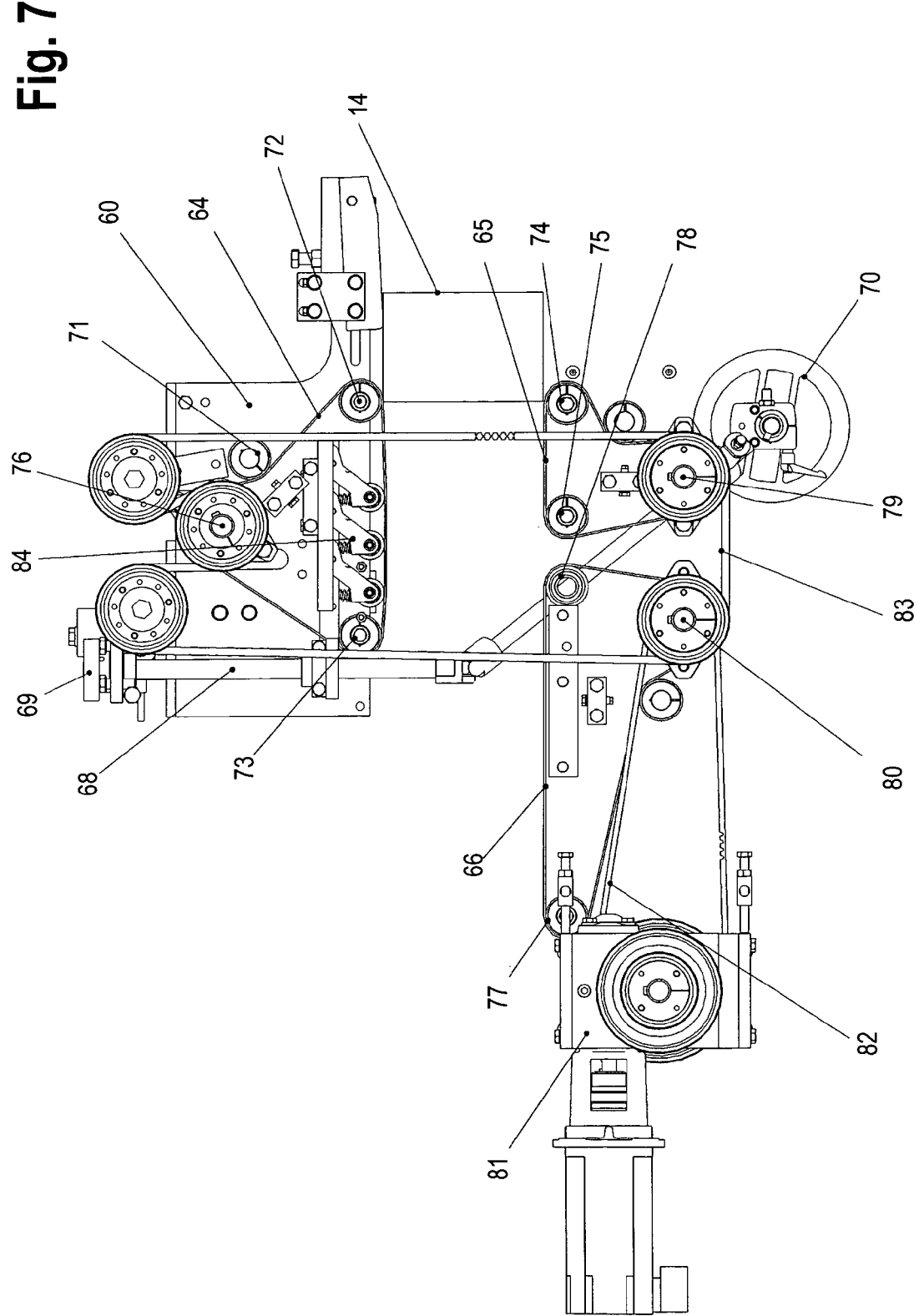
FIG. 7 is a side view of the accelerator belt station of FIG. 6.

FIGS. 6 and 7 illustrate a typical accelerator belt station 2 which is driven at a surface speed that is slightly faster than the metering belts, causing the product to separate and providing a means for inserting flight bars between successive products. The accelerator belt module consists of a main frame 59, an upper endless conveyor belt 64 mounted between a pair of moveable side frames 60, 61, and a pair of lower endless conveyor belts 65, 66 supported by a pair of side frames 62, 63. The lower belts are divided into two assemblies, providing a gap for inserting flight bars from below the conveying surface via the lower, driven flighted conveyor 5. The upper and lower opposed belts are spaced vertically from one another a distance slightly less than the thickness (i.e. height) of the product so as to positively grip the items.

The vertical spacing of the belts can be altered for product size changes by rotating a manual hand-wheel 70, which in turn rotates a pair of threaded shafts 67, 68 that are driven at one end through a pair of sprockets and mechanically linked through a common chain 69, in turn driving a pair of mating threaded blocks (not shown), thereby moving the upper frames. A manual means is shown for altering the vertical spacing. However, a motorized means could be provided to automate this adjustment.

The upper, moveable frames are guided on a pair of linear slides (not shown). The upper belt assembly consists of a pair of idler shafts 72, 73, a tensioning roller 71, and a driven roller 76 that has improved surface properties to enhance friction between the belt and pulley (knurling or rubber). A series of pivoting, spring-loaded rollers 84 are used as a backing surface to help compensate for product size variations.

Similarly, the lower belt assemblies consist of a series of idler shafts 74, 75, 77, 78 and a pair of driven rollers 79, 80 with similar surface characteristics. The upper and lower belts are synchronously driven by a rotary actuator to control the surface speed of the belts, such as a servo motor and gearbox 81, driving the rollers through a series of keyed pulleys and a pair of timing belts 82, 83.

Figure 8:
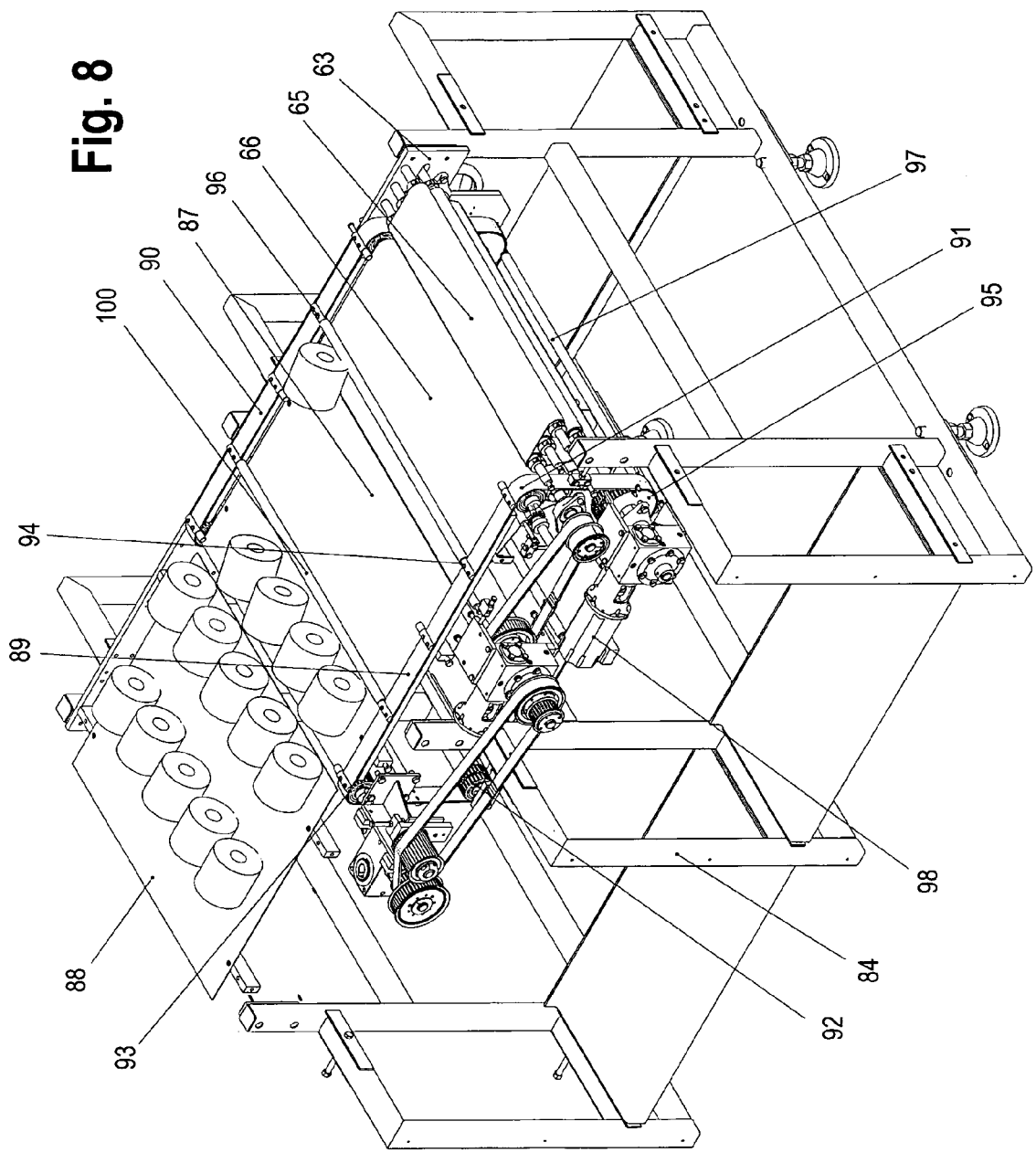
FIG. 8 is a perspective view of a lower driven flighted conveyor station formed in accordance with the invention.

FIG. 8 illustrates the lower, driven flighted conveyor 5 consisting of a main frame 84 with integral side frames 62, 63, with a horizontal product support plate 87 extending between the lower accelerator belt assembly 66 and a second product support plate 88. A pair of endless toothed belts 89, 90 each passes around a series of idling sprockets 91, 92, 93 and a driven sprocket 95 keyed to a common drive shaft 97. The drive shaft is synchronously driven at one end by a rotary actuator, such as a servo motor and gearbox 98.

Between said endless toothed belts 89, 90 are connected carrying members 100, called flights, that are spaced along the length of the belts at intervals of approximately 15 inches for conveying product, such as individual rolls or groups of rolls of bathroom tissue rolls that are approximately 4.5 inches long or paper toweling rolls that are approximately 11 inches long. The flights can be easily added or removed from the belts using a pair of mounting lugs 94, 96, thereby allowing the spacing between flights to be altered for accommodating different length product, such as multiple rolls of bathroom tissue or toweling.

Typically the lower flight conveyor cycles at a steady rate, which is dependent on the production rate of the machine. For example, if a package is being produced from a single roll of bathroom tissue at a rate of 180 packages per minute, the flight conveyor would cycle at an average rate of 45 in/sec. It is also possible to modulate the lineal speed of the conveyor to alter the amount of time that the product resides at any location along the path of the flight conveyor. For example, the flights could slow down to half the average rate 22 in/sec for half the cycle, and accelerate to 68 in/sec for the other half of the cycle.

Figure 9:
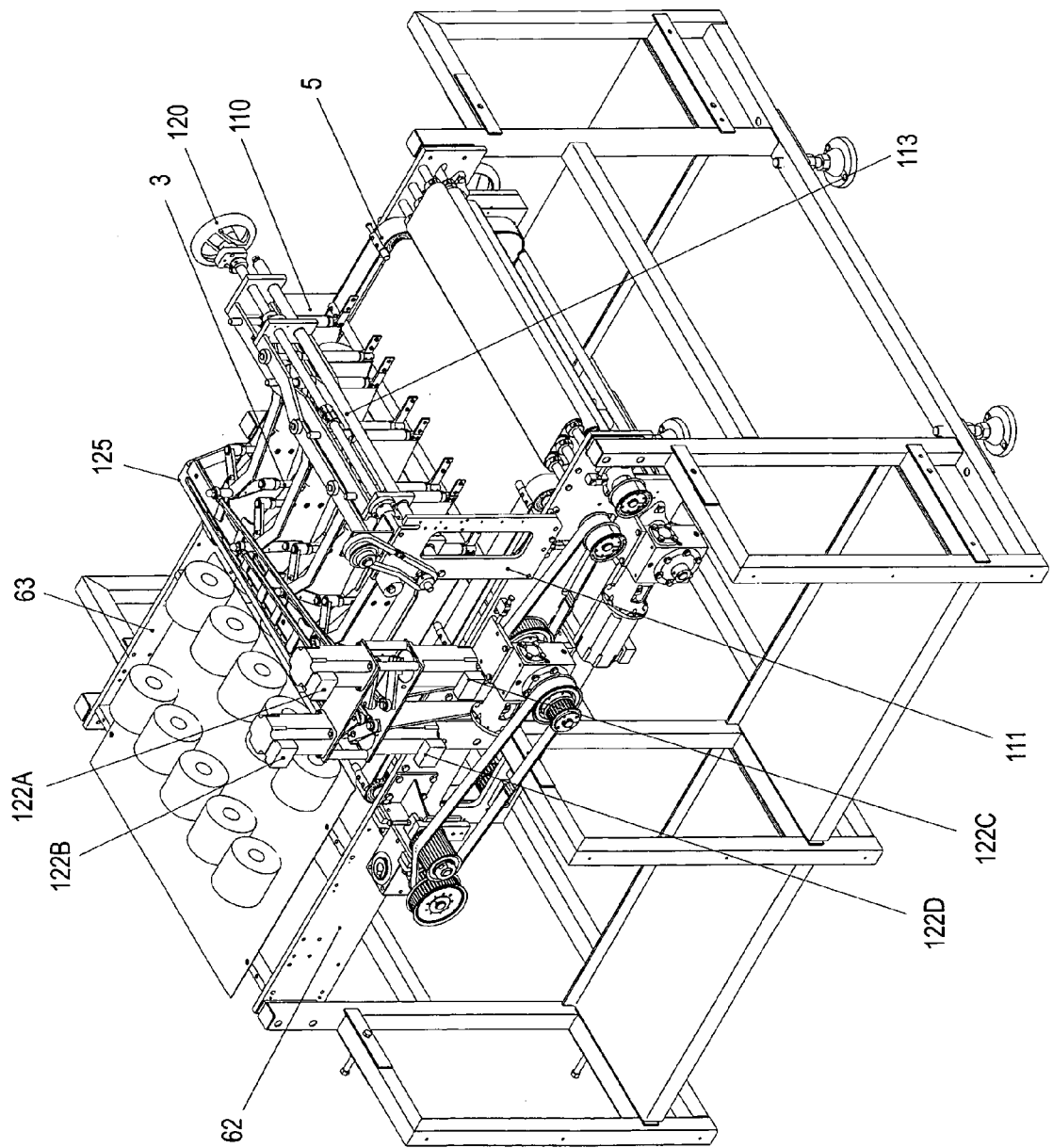
FIG. 9 is a perspective view of a diverting station in accordance with the invention mounted within the wrapper.
Figure 10:
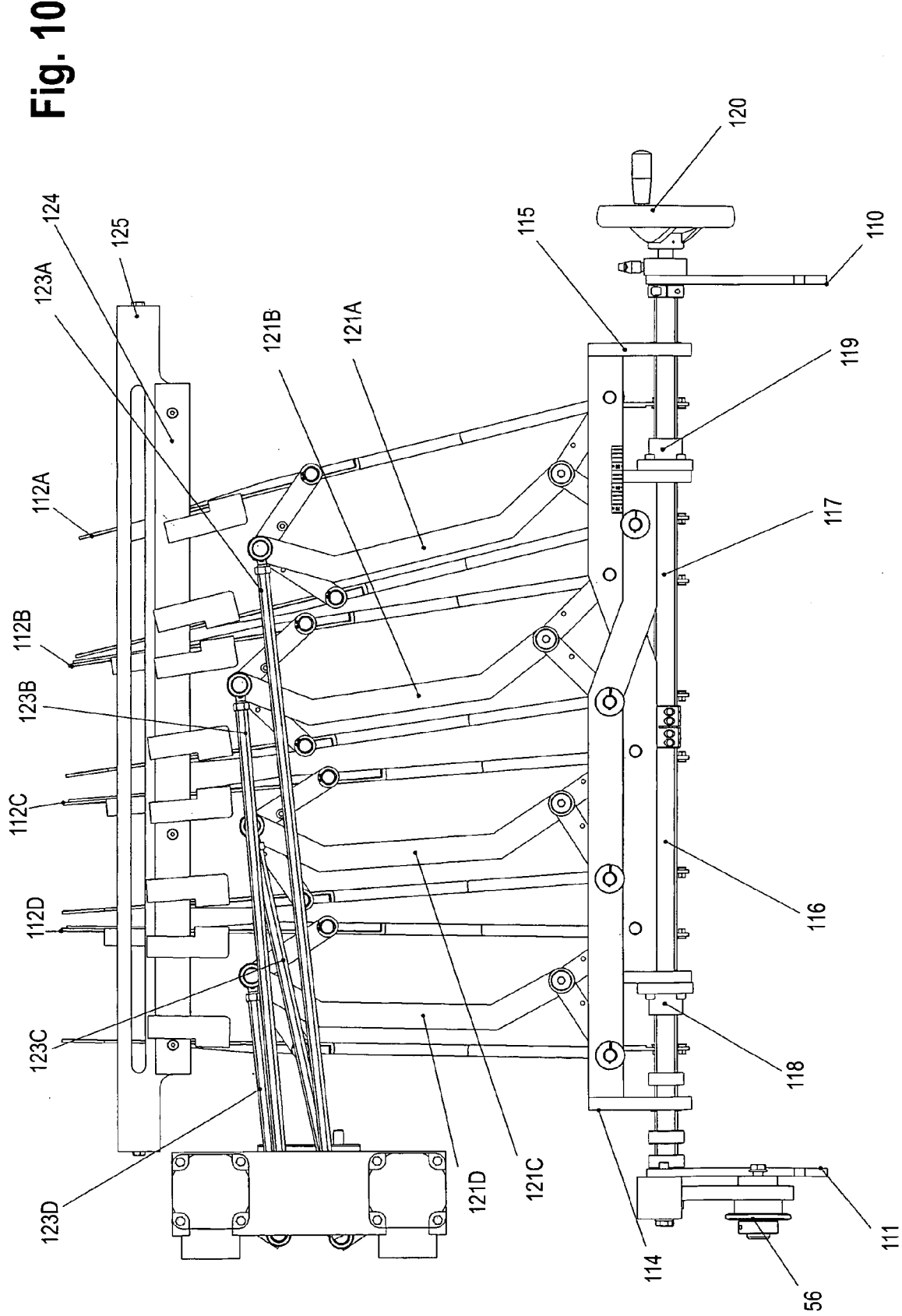
FIG. 10 is a top plan view of the diverting gate station of FIG. 9.

FIG. 9 illustrates the inventive diverter gate station 3 mounted above the lower, driven infeed conveyor 5 using a pair of support frames 110, 111 that are rigidly mounted to the lower conveyor side frames 62, 63. FIG. 10 is a top view of the diverter gate station, showing four gate pairs 112A, 112B, 112C, 112D, corresponding in number to the metering belt sets used at the infeed of the wrapper. The gates work in concert with the lower flighted conveyor to divert product across the width of the machine as it is transported by the flights, enabling product to enter at the leading end at a side-to-side spacing that corresponds with the metering belts and altering the spacing between lanes as the product is discharged at the opposite end.

Each gate is pivotally supported at one end and held in position laterally by a pair of adjustment brackets 114, 115. Bracket 115 supports the gates that make up the right half of each gate pair while adjustment bracket 114 supports the gates that make up the left half of each pair. The brackets are supported on a common linear guide shaft 113 (FIG. 9) and can be drawn towards or away from one another by rotating a threaded shaft that consists of opposite handed threads 116, 117 using corresponding threaded collars 118, 119 mounted within the adjustment brackets. This causes the gap between gate pairs to vary to accommodate different product sizes. A manual hand-wheel is shown 120 for altering the gate spacing. However, a motorized means could be provided to automate this adjustment.

Figure 11:
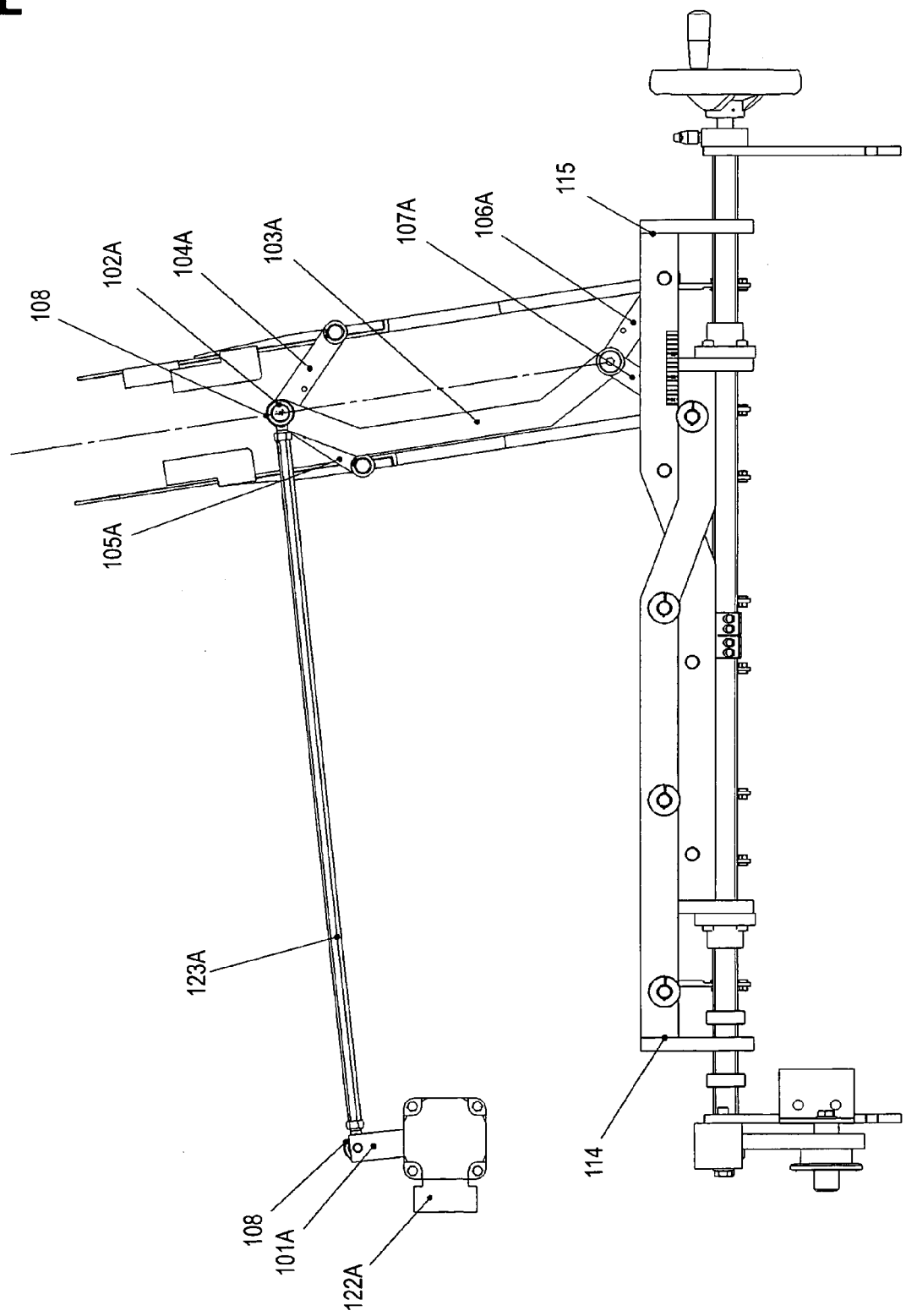
FIG. 11 is a top view of one of the diverting gates showing the width adjustment and pivot linkage mechanism in greater detail.

Linkage mechanisms 121A, 121B, 121C, 121D, are used to maintain parallelism between gate pairs and alter the gap at both ends of the gates simultaneously. FIG. 11 shows a more detailed view of one such gate pair 112A and its corresponding linkage mechanism 121A. A pair of linkages 106A, 107A is pivotally mounted at one end to the gate adjustment brackets 114, 115 such that there pivot points correspond to the pivot locations of the gates. At their opposite end, the linkages are pivotally mounted to a transfer linkage 103A. A second pair of identical linkages 104A, 105A is pivotally connected to the transfer linkage at one end and near the discharge end of the gates at there opposite end, forming a pair of four bar linkage arrangements. The four bar linkages provide a means for transferring any change in dimension between the gate pivots via the adjustment brackets to a corresponding change in dimension at the discharge end of the gates. A second objective of the linkage mechanisms is to provide an attachment means for the gate pivot actuation devices, used for varying the angular positions of the gates.

Referring to FIGS. 9–11, servo motors 122A, 122B, 122C, 122D are linked to there respective gate pairs through turnbuckles 123A, 123B, 123C, 123D with low friction rotary bearings mounted at each end 108. FIG. 11 shows one such turnbuckle pivotally mounted at one end to a swing arm 101A that is keyed to the motor shaft and to extended pins 102A at the connection point of linkages 103A, 104A, and 105A at the opposite end. This connection means translates any rotational movement of the motor shaft into a corresponding rotational movement of the gates. The gates are additionally supported at their outfeed end by providing a support surface 124 made up of a low friction material, such as nylon. The low friction material is fastened to a second support bracket 125 that is rigidly fastened to the side frames 85, 86.

With reference to FIGS. 4, 5 and 10, means is provided for maintaining the orientation of the product from the metering belt station through the diverter gate station using a series of guide rails 41A, 41B, 41C, 41D that extend between said stations. The rails are supported on one end by a pair of adjustment brackets 49, 50 and on the opposite end by the diverting gates 112A, 112B, 112C, 112D. The lateral spacing between each pair of guide rails is adjusted in unison, along with the gates, by turning the gate width adjustment manual hand-wheel 120, thereby turning the gate width adjustment shafts 116, 117 which are mechanically linked through a common chain and keyed sprockets (not shown) to a second shaft, consisting of a mating pair of opposite threaded shafts 45, 46. Threaded collars of complimentary threads are rigidly mounted to said adjustment brackets 49, 50 and are drawn towards or away from one another in unison with the gates to accommodate different product sizes. The adjustment brackets are additionally supported by a common low friction slide rail 53. Means are also provided for sensing the position of the product in each lane 40A, 40B, 40C, 40D to control the placement of the product for downstream operations. This would typically consist of a pair of through-beam fiber optic sensors.

Figure 12:
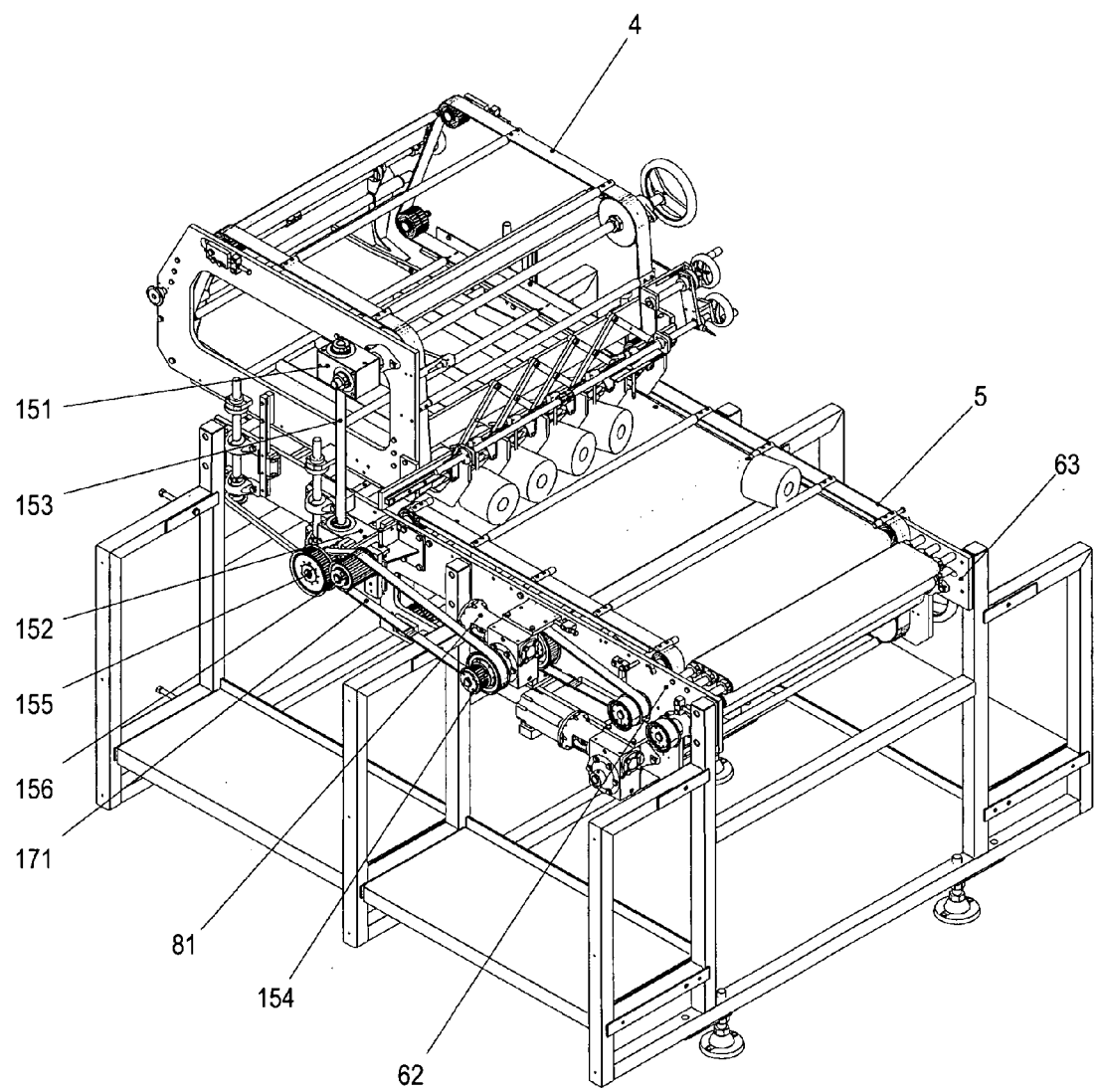
FIG. 12 is a perspective view of an upper driver flighted conveyor in accordance with the invention mounted within the wrapper.
Figure 13:
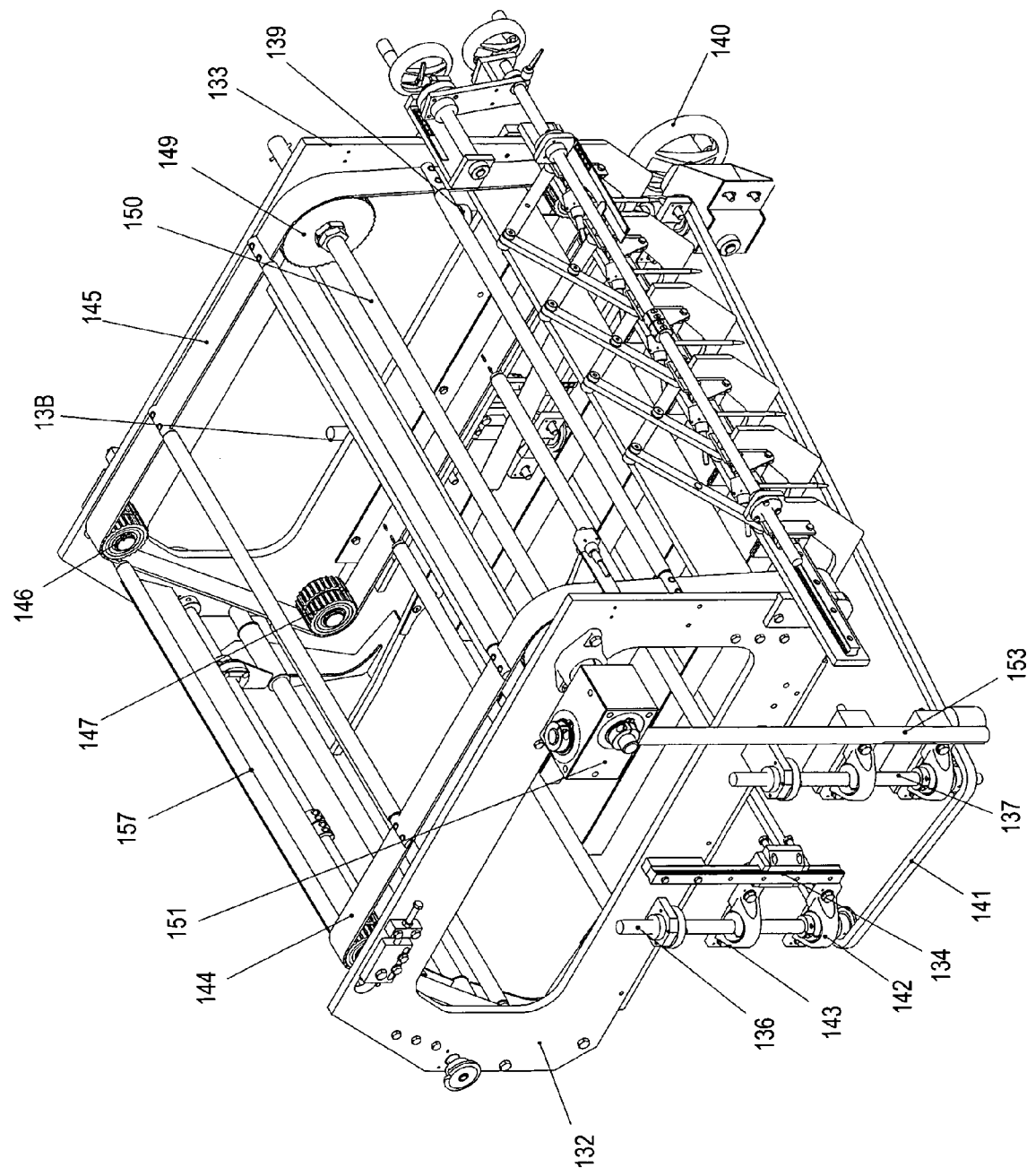
FIG. 13 is an enlarged view of the upper driver flighted conveyer of FIG. 11.

FIGS. 12 and 13 illustrate the upper, merging flighted conveyor 4 positioned above the lower, driven infeed conveyor 5. FIG. 13 illustrates the merging flighted conveyor, consisting of a pair of side frames 132, 133 that are vertically guided through a pair of low friction linear bearings (not shown). The upper conveyor is supported through a series of threaded shafts 136, 137, 138, 139 and is positioned directly above the second product support plate 88 (FIG. 8). Means are provided for adjusting the height of the conveyor for product size changes by turning a manual hand wheel 140, thereby turning one threaded shaft. Although a manual adjustment means is shown for altering the conveyor height, a motorized means could be provided to automate this adjustment.

The threaded shafts 136–39 are synchronously driven through a series of sprockets keyed to one end of each shaft that and are connected by a common chain 141. Each of the threaded shafts is supported in a pair of housed low friction bearings 142, 143 that are fastened to the lower conveyor side frames 62, 63.

The merging flighted conveyor 4 consists of a pair of synchronously driven, endless timing belts 144, 145, each passing around a series of idling sprockets 146, 147, 148 (not shown) and a driven sprocket 149 that is keyed to a common drive shaft 150. The shaft is driven through a pair of right angle gearboxes 151, 152 (FIG. 12) connected by a splined shaft 153 that is synchronously driven by the accelerator belt servo motor and gearbox 81 using a pair of keyed timing belt sprockets 154, 155, a tensioning pulley 156 and a common timing belt 171. Between said flight conveyor timing belts 144, 145 are connected carrying members or flight bars 157 that are spaced along the length of the belts at intervals of approximately 15 inches for accommodating product such as rolled bathroom tissue rolls that are 4.5 inches long or paper toweling that is 11 inches long. Flights can be selectively added or removed to alter the spacing between successive flights to accommodate placement of a grouping of items, such as multiple rolls of bathroom tissue. The upper flight conveyor 4 cycles at a steady rate, which is dependent on the production rate of the machine. For example, if a package is being produced from a single roll of 4.5 inch long bathroom tissue at a rate of 180 packages per minute, the flight conveyor would cycle at an average rate of 45 in/sec.

Figure 14:
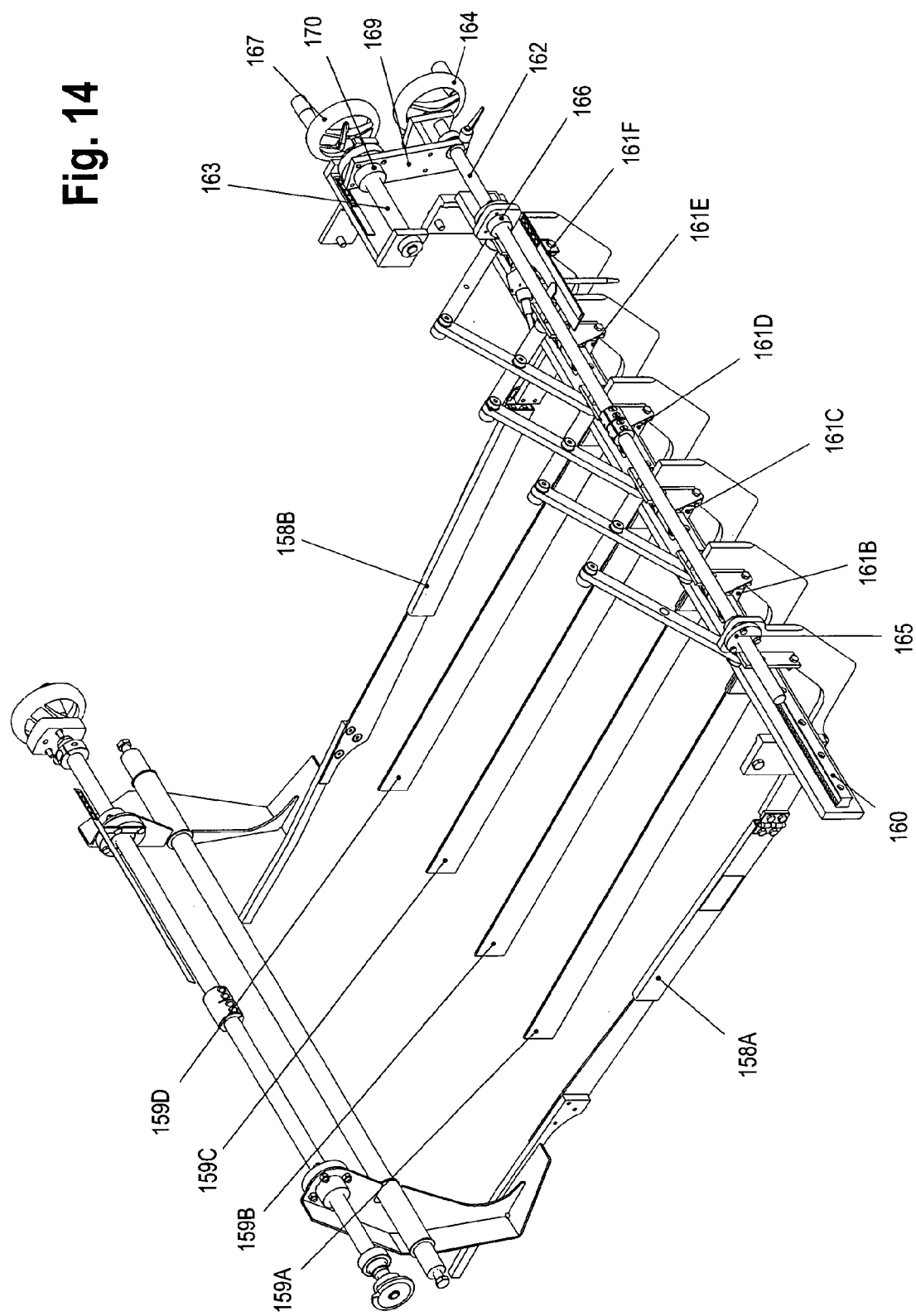
FIG. 14 is a perspective view of the merging guide rails formed in accordance with the inventor.
Figure 15:
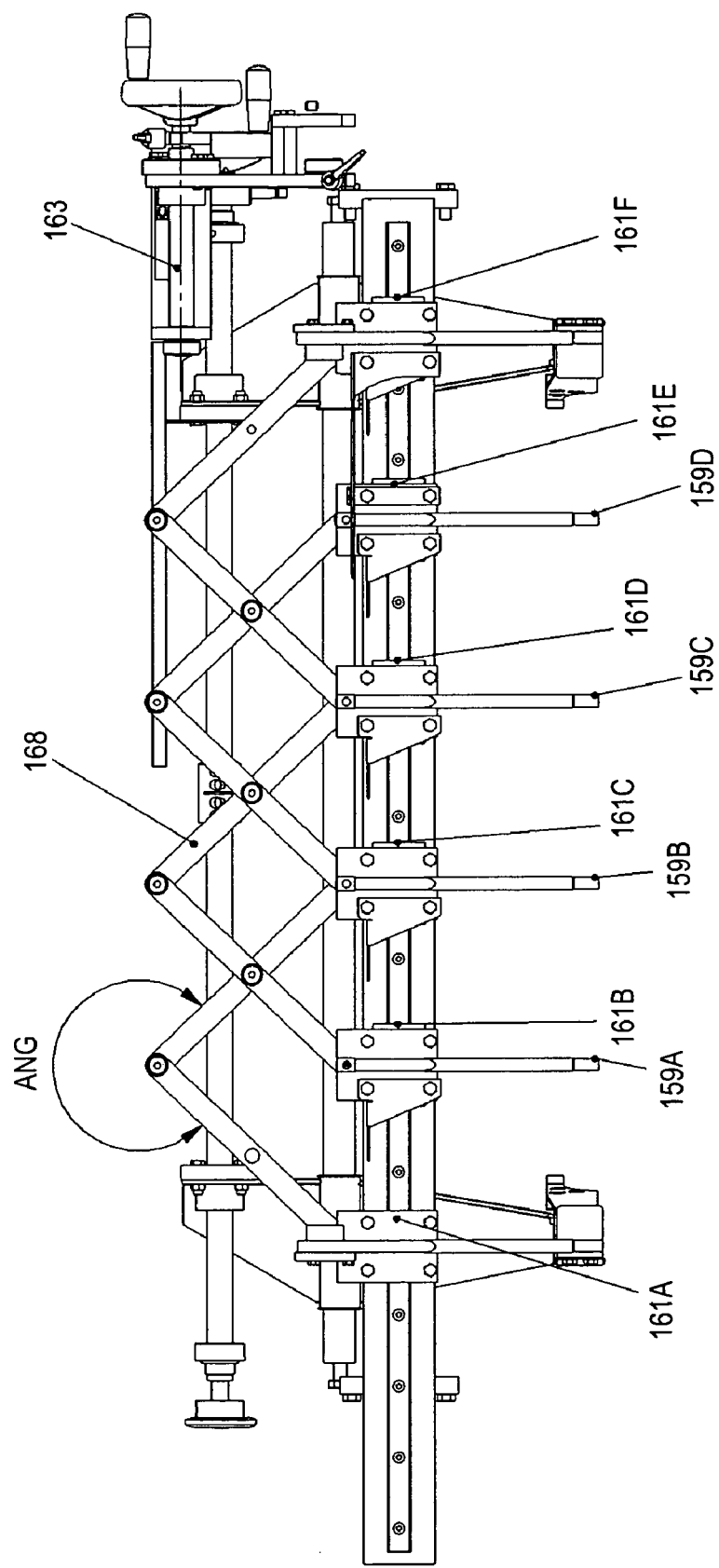
FIG. 15 is a end view of the merging guide rails.

FIGS. 14 and 15 illustrate the merging flight conveyor product guide rails, consisting of a pair telescoping outer guide rails 158A, 158B and flexible intermediate guides 159A, 159B, 159C, 159D mounted on a common linear slide rail 160 and supported by mating linear slide blocks 161A, 161B, 161C, 161D, 161E, 161E, 161F. Adjustment means is provided for altering the spacing between adjacent guides using a first threaded shaft 162 and a second threaded shaft 163. The shaft 162 is rotatably driven through a manual hand-wheel 164. However, a motorized system could be used to automate this adjustment. The threaded shaft consists of two shaft segments, one half consisting of right hand threads and the opposite half consisting of left hand threads to allow a pair of mating threaded collars 165, 166 to be drawn toward or away from another.

FIG. 15 shows a detailed end view of the linkage mechanism 168, with the first threaded shaft omitted for clarity. A series of linkages interconnect the slide blocks 161A, 161B, 161C, 161D, 161E, 161F, providing an adjustment means for product size changes that results in a uniform spacing between the guides. Linkages, being of similar length and construction, are pivotally connected to the slide blocks at one end, to a first corresponding link at the opposite end, and to a second corresponding link at the midpoint, such that the angle (ANG) between corresponding linkages is equal. As the outer guide rails are drawn toward or away from one another by the first threaded shaft, the angle between said corresponding linkages changes, but remains equivalent. This results in an equivalent spacing between the intermediate guide rails.

A second threaded shaft 163 is provided for laterally shifting the position of all the intermediate guides in unison, allowing for one of the intermediate guides to be placed near the machine centerline or slightly off the centerline. FIG. 14 shows a manual adjustment means, using a hand-wheel 167 driving a second threaded shaft 163. However, a motorized adjustment could be used to automate this adjustment. A mating threaded collar 170 mounted within an adjustment bracket 169 causes the first adjustment shaft 162 to move laterally along the slide rail, causing the intermediate guides to shift accordingly. This adjustment provides a means for locating an intermediate guide rail on the centerline of the machine when producing a package format with even number product lanes, or shifting it off center approximately ½ of the product diameter when producing a package format with an odd number of product lanes. This results in the rolls being brought to the centerline of the machine as they exit the merging flight conveyor module.

Figure 16:
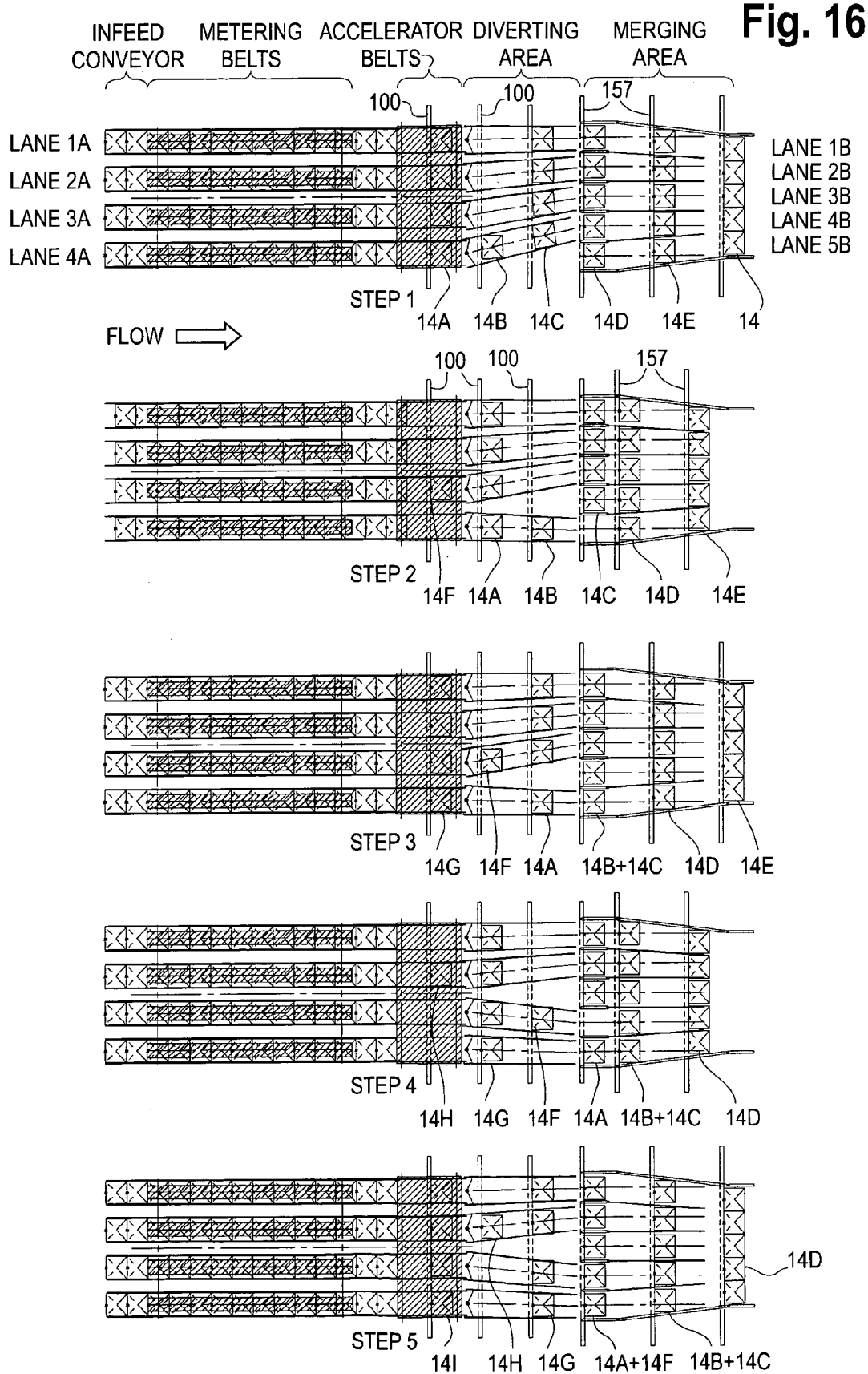
FIG. 16 is a diagrammatic illustration of the product diverter apparatus, showing a typical sequence of operation when diverting four lanes of product at its infeed end into five lanes of product at its discharge end.

FIG. 16 shows a step-by-step sequence of operation of the invention when converting four lanes of product into a five wide package configuration. Product 14, such as rolled tissue or toweling, enters the apparatus from the left, where it is presented in four discrete lanes from the infeed conveyor, and exits to the right in five discrete lanes. The product is also shown merged on the centerline of the wrapper as it exits the apparatus. STEPS 1–5 represent five sequential cycles of the diverting gates.

STEP 1 shows the metering belts accepting product from the infeed conveyor, presented in an end to end abutment relationship, and advancing the appropriate lanes at the proper time in the gating cycle, such that the flights 100 in the diverting area are properly placed behind each set of rolls as they exit the accelerator belts. The flight bars 100 shown in the diverting area represent the flights described in the lower flighted conveyor 5. The metering belts are intermittently cycled, such that a complete set of four rolls 14A are shown gripped between the accelerator belts, thereby allowing a flight bar 100 to be inserted behind said rolls. In the diverting area, the diverting gates work in concert with the lower driven flighted conveyor 5 to divert product laterally into the appropriate lane while the flighted conveyor transports the product into the merging area. A single roll 14B occupies the flight space immediately adjacent to the rolls in the accelerator belts, followed by another set of four rolls 14C. It will become clear in the following steps that these rolls were placed in previous cycles by actuating the appropriate metering belts. It can be seen that the four rolls 14C exiting the diverting area are guided laterally by the gates as the lower flighted conveyor transports them through the diverting area. The merging area consists of the upper driven flighted conveyor 4 and the merging guide rails. Sets of five rolls 14D, 14E can be seen exiting the apparatus, with the rolls merged and centered on the machine.

STEP 2 shows a further advancing of the rolls after one gating cycle, illustrating a single roll 14F gripped between the accelerator belts as the result of intermittently cycling the metering belts corresponding to LANE 3A. The timing of the belt motion placed the roll 14F just in front of the subsequent flight bar 100 following. In the diverting area, the lower flighted conveyor 5 has advanced the previous set of four rolls 14C exactly one flight spacing and has deposited the rolls onto a dead plate or stationary plate in the uppermost lanes within the merging area (LANES 1B, 2B, 3B, 4B). The product then comes to rest temporarily on a dead plate mounted in the merging area. In this step, the gate pair corresponding to the metering belts in LANE 4A can be seen having pivoted from its previous position shown in STEP 1, corresponding to LANE 4B in the merging area, to a new angular position corresponding to LANE 5B in the merging area. The diverting gate is timed with the flighted conveyor 5 such that the pivoting begins immediately after the set of four rolls 14C is deposited in the merging area dead plate and is completed before the lower flight conveyor advances the single roll 14B one flight spacing. In a typical wrapping operation, the cycle time would be between 0.4 and 0.2 seconds. The upper flighted conveyor 4 is seen having advanced the five roll sets 14D, 14E approximately ½ the distance of a flight spacing during the cycle.

STEP 3 shows a further advancing of the rolls in one gate cycle, illustrating a second set of four rolls 14G gripped between the accelerator belts, resulting from the intermittent cycling of all four metering belts, which has placed the rolls just in front of the adjacent flight bar 100. In the diverting area, the lower flighted conveyor 5 has advanced the previous single roll 14B exactly one flight spacing and has deposited the single roll into the lowermost lane within the merging area LANE 5B, imparted from the guiding action of the diverting gate. The product then comes to rest temporarily on a dead plate mounted in the merging area. In this step, the gates have not moved from their previous position, and can be seen guiding the next set of four rolls 14A into merging lanes 1B, 2B, 3B, and 5B. The upper flighted conveyor 4 is seen having advanced the five roll sets 14D, 14E approximately ½ the distance of a flight spacing during the cycle and has captured all five rolls 14B+14C from the previous step STEP 2 from behind with a flight bar 157.

STEP 4 shows a single roll 14H gripped between the accelerator belts, resulting from the intermittent cycling of metering belts in LANE 2A, which has placed the roll just in front of the adjacent flight bar 100 in the lower flighted conveyor. In the diverting area, the lower flighted conveyor has advanced the previous set of four rolls 14A exactly one flight spacing and has deposited the rolls into the uppermost lanes within the merging area (LANES 1B, 2B, 3B, 5B), imparted from the guiding action of the diverting gates. The product then comes to rest temporarily on a dead plate mounted in the merging area. In this step, the gate pair corresponding to the metering belts in LANE 3A can be seen having pivoted from its previous position shown in STEP 3, corresponding to LANE 3B in the merging area, to a new angular position corresponding to LANE 4B in the merging area. The diverting gate is timed with the flighted conveyor, such that the pivoting begins immediate after the set of four rolls 14A is deposited in the merging area dead plate and is completed before the lower flight conveyor advances the single roll 14F one flight spacing. The upper flighted conveyor is seen having advanced the five roll sets approximately ½ the distance of a flight spacing during the cycle.

STEP 5 shows a further advancing of the rolls in one gate cycle, illustrating a third set of four rolls 14I gripped between the accelerator belts, resulting from the intermittent cycling of all four metering belts, which has placed the rolls just in front of the adjacent flight bar in the lower flighted conveyor. In the diverting area, the lower flighted conveyor has advanced the previous single roll 14F exactly one flight spacing and has deposited the single roll into the lowermost lane within the merging area (LANE 4B), imparted from the guiding action of the diverting gate. The product then comes to rest temporarily on a dead plate mounted in the merging area. In this step, the gates have not moved from their previous position, and can be seen guiding the next set of four rolls 14G into merging lanes 1B, 2B, 4B, and 5B. The upper flighted conveyor is seen having advanced the five roll sets approximately ½ the distance of a flight spacing during the cycle and has captured all five rolls 14A+14F from the previous step (STEP 4) from behind with a flight bar. The cycling repeats such that each metering belt deposits a single roll every eight gate cycles, resulting in a balanced flow of product in the infeed conveyor lanes.

Figure 17:
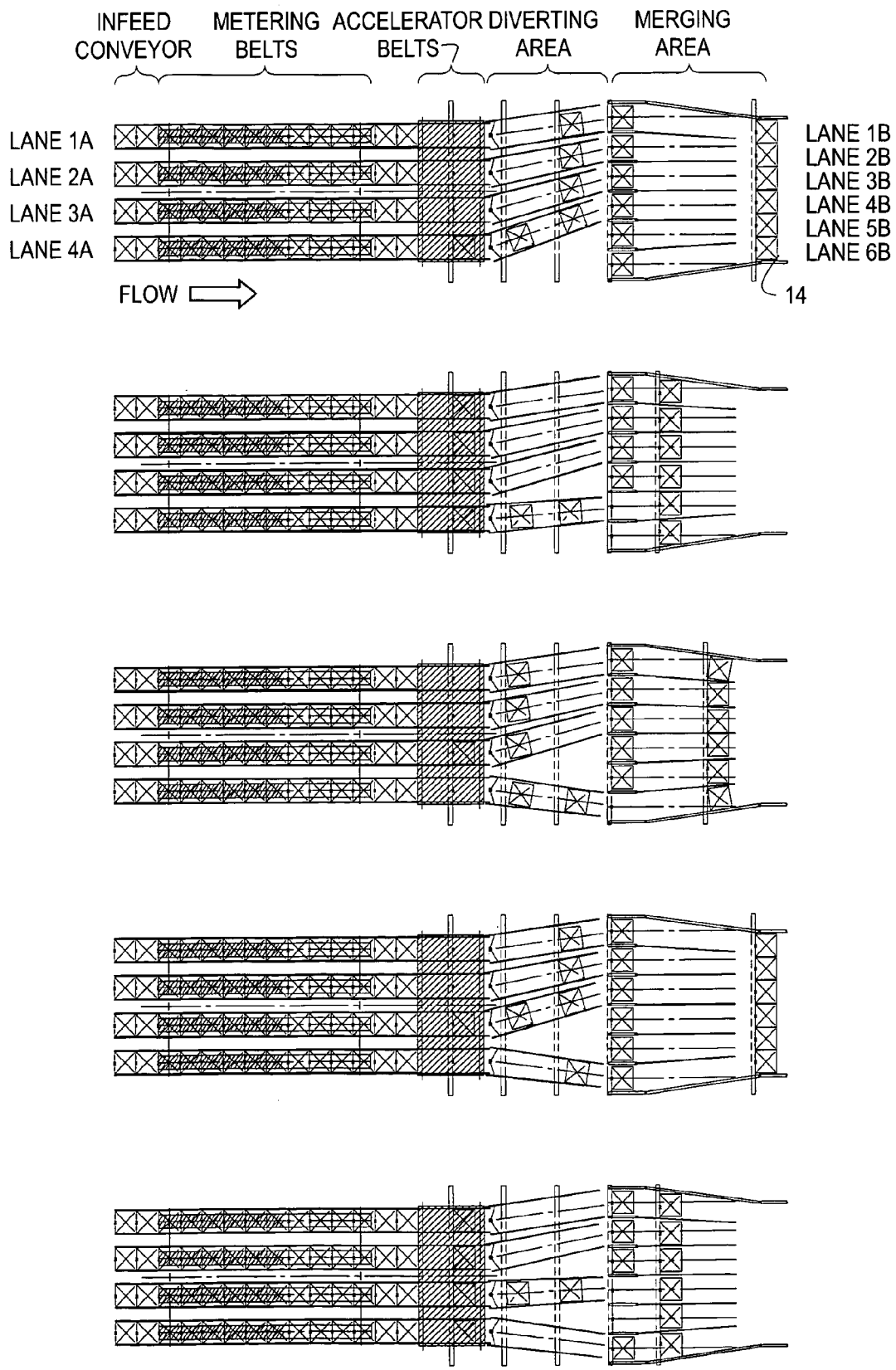
FIG. 17 is a view similar to FIG. 16 showing a typical sequence of operation when diverting four lanes of product at its infeed end into six lanes of product at its discharge end.

FIG. 17 shows a sequence of operation of the concept when converting four lanes of product into a six wide package configuration. It is apparent that the apparatus is not limited in the number of lanes into which the product can be diverted. Product, such as rolled tissue or toweling 14, enters the apparatus from the left and is presented in four discrete lanes from the infeed conveyor, and exits the apparatus to the right in six lanes with the product merged together on the center line of the wrapper. This is accomplished in a sequence similar to the method described above, except that the four lanes of product are followed by two gating cycles in which individual rolls are fed from a single lane, with the gates diverting them into the proper lanes at the discharge end of the diverting module.

Figure 18:
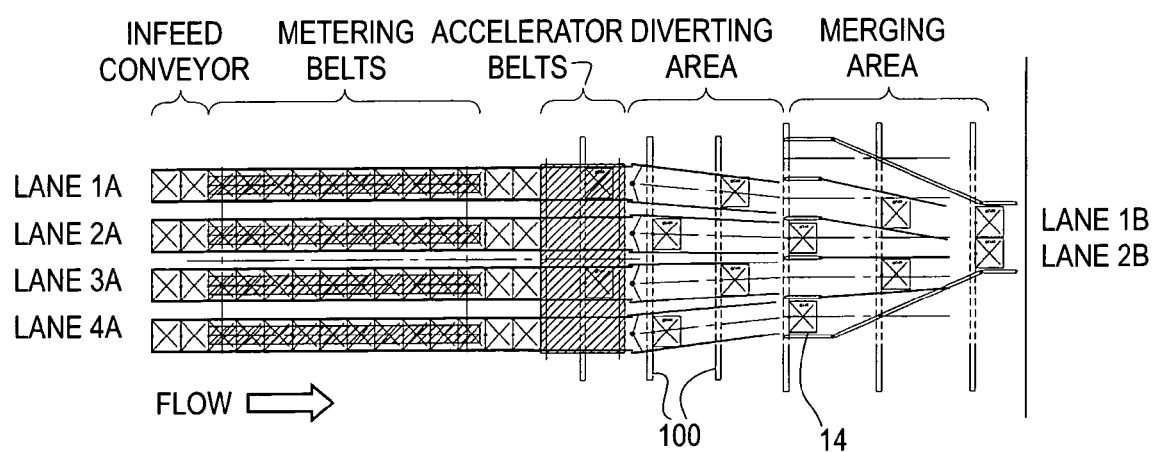
FIG. 18 is a view similar to FIG. 16 showing a typical sequence of operation when converging four lanes of product at its infeed end into two lanes of product at its discharge end.

FIG. 18 shows a sequence of operation of the invention when converting four lanes of product into a two wide package configuration. Product, such as rolled tissue or toweling 14, enters the apparatus from the left, where product is presented in four discrete lanes from the infeed conveyor, and exits the apparatus to right in two lanes with the product merged together on the centerline of wrapper. While this illustrates the method used to produce a two wide package configuration, similar steps would be used to produce one, three, or four wide configurations.

The metering belts are seen accepting product from the infeed conveyor in an end-to-end abutment relationship, and advancing the product in the appropriate lanes at the proper time in the cycle, such that the flights 100 in the diverting area, made up of the lower flighted conveyor 5 and diverting gates, are inserted behind each set of rolls as they exit the accelerator belts. The metering belts are intermittently cycled or run at a continuous velocity, such that a set of two rolls are shown being gripped between the accelerator belts, creating a gap between the rolls, thereby allowing a flight bar to be inserted from below using the lower driven flighted conveyor 5. In the diverting area the diverting gates remain stationary as the lower driven flighted conveyor transports the product into the merging area while the gates guide the product laterally. It can be seen that a two rolls occupy every flight space. This is accomplished by cycling the appropriate metering belts at the appropriate time in the cycle, or running the metering belts in synchronous pairs, with the pairs being out of phase ½ of the product length. In the merging area, sets of rolls in a two wide configuration can be seen exiting the apparatus on the centerline of the machine. In this situation, the upper driven flighted conveyor 4 is seen advancing one flight spacing for every flight spacing of the lower flighted conveyor. The cycling repeats such that each pair of metering belts deposits a set of two rolls every other cycle, resulting in a balanced flow of product in the infeed conveyor lanes.

In the preferred embodiment each of the metering conveyers belts is independently driven so that any one of the conveyer belts can advance a roll along one of the infeed lanes independently of the other conveyer belts. Each of the diverting gates is also independently controlled so that the diverting gate which is associated with the metering conveyer belt which is operated independently can be pivoted independently of the other diverter gates. However, it is not necessary that each of the metering belts and each of the diverter gates be independently controlled. If desired, only one metering belt and only one diverting gate can be independently controlled.

While in the foregoing specification a detailed description of a specific embodiment was set forth for the purpose of illustration, it will be understood that many of the details described herein can be varied by those skilled in the art without departing from the spirit and scope of the invention.

We claim:

1. An infeed apparatus for a machine for wrapping products comprising:
   a plurality of metering conveyors for a advancing products along a plurality of product infeed lanes, at least one of the metering conveyors being driven independently of the others whereby said one conveyor can advance product along one of the infeed lanes independently of product in the other infeed lanes,
   an accelerator conveyor for advancing product along said infeed lanes from the metering conveyors at a speed which is faster than the speed of the metering conveyors,
   a diverter frame, and
   a plurality of diverter gates mounted on the diverter frame, each of the diverting gates having an infeed end for receiving product from one of said infeed lanes and a discharge end for delivering product to a product output lane, the infeed end of at least the diverting gate which is associated with said one infeed lane being pivotally mounted on the diverter frame whereby the discharge end of the pivotally mounted diverting gate can selectively deliver product to more than one product output lane and the number of output lanes is greater than the number of infeed lanes.

2. The apparatus of claim 1 including an output conveyor for advancing product along the output lanes.

3. The apparatus of claim 2 in which said output conveyor includes a plurality of flight bars which extend across the output lanes and which are engageable with product in the output lanes.

4. The apparatus of claim 1 including a diverter gate conveyor for advancing product from said accelerator conveyor through said diverting gates.

5. The apparatus of claim 4 in which said diverter gate conveyor includes a plurality of flight bars which extend across the infeed lanes and which are engageable with product in the infeed lanes.

6. The apparatus of claim 1 including a motor connected to said pivotally mounted diverting gate for pivoting the diverting gate between a plurality of output lanes.

7. The apparatus of claim 1 in which each of said diverting gates includes right and left gate halves, each of the gate halves being adjustably mounted on the diverter frame whereby the spacing between the right and left gate halves of each gate can be adjusted.

8. The apparatus of claim 7 including means for adjusting the spacing between the right and left gate halves of each of the diverting gates.

9. An infeed apparatus for a machine for wrapping products comprising:

a plurality of metering conveyors for advancing products along a plurality of product infeed lanes, each of the metering conveyors being driven independently of the others whereby each of said metering conveyors can advance product along one of the infeed lanes independently of product in the other infeed lanes, an accelerator conveyor for advancing product along said infeed lanes from the metering conveyors at a speed which is faster than the speed of the metering conveyors a diverter frame, and, a plurality of diverting gates pivotally mounted on the diverter frame, each of the diverting gates having an infeed end which is pivotally mounted on the diverted frame for receiving product from one of said infeed lanes and a discharge end for delivering product to a product output lane, the number of output lanes being greater than the number of infeed lanes, whereby the discharge end of each of said diverting gates can selectively deliver product to more than one product output lane.

10. The apparatus of claim 9 including an output conveyor for advancing product along the output lanes.

11. The apparatus of claim 10 in which said output conveyor includes a plurality of flight bars which extend across the output lanes and which are engageable with product in the output lanes.

12. The apparatus of claim 9 including a diverter gate conveyor for advancing product from said accelerator conveyor through said diverting gates.

13. The apparatus of claim 12 in which said diverter gate conveyor includes a plurality of flight bars which extend across the infeed lanes and which are engageable with product in the infeed lanes.

14. The apparatus of claim 9 including a motor for each of the diverting gates, each of the motors being connected to one of the diverting gates for pivoting the diverting gate between a plurality of output lanes.

15. The apparatus of claim 9 in which each of said diverting gates includes right and left gate halves, each of the gate halves being adjustably mounted on the diverter frame whereby the spacing between the right and left gate halves of each gate can be adjusted.

16. The apparatus of claim 15 including means for adjusting the spacing between the right and left gate halves of each of the diverting gates.

17. A method of delivering products to a machine for wrapping the products comprising the steps of:

advancing a first set of a plurality of products along a plurality of infeed lanes at a first speed, accelerating the advance of said first set of products along the infeed lanes, advancing said first set of products to a diverting area and advancing the products from the diverting area to a first set of output lanes which correspond in number to the plurality of infeed lanes, advancing at least one product along at least one of said infeed lanes, accelerating the advance of said at least one product along said at least one infeed lane, advancing said at least one product to said diverting area, diverting said at least one product to at least one output lane which is not within said first set of output lanes, and advancing at least one product form the diverting area to said at least one output lane, and advancing said first set of products and said at least one product along said first set of output lanes and said at least one output lane.

18. The method of claim 17 in which said first set of products is maintained stationary in said first set of output lanes until said at least one product is advanced to said at least one output lane.

19. The method of claim 17 in which said first set of products is advanced to said first set of output lanes by a flight bar of a first flighted conveyor, said at least one product is advanced to said at least one output lane by a flight bar of said first flighted conveyor, and said first set of products and said at least one product is advanced along the output lanes by a flight bar of a second flighted conveyor.

20. The method of claim 17 in which said diverting area includes a pivoting diverting gate and said at least one product is diverted to said at least one output lane by pivoting said diverting gate.

* * * * *